United States Patent
Wong et al.

(10) Patent No.: US 11,512,803 B2
(45) Date of Patent: Nov. 29, 2022

(54) CIRCULAR CATCH BASIN

(71) Applicant: National Diversified Sales, Inc., Fresno, CA (US)

(72) Inventors: Bryce Wong, Exeter, CA (US); David Rusch, Springville, CA (US); Ryan Larsen, Visalia, CA (US); Daniel Nourian, Reedley, CA (US); Michael Schreiber, York, PA (US)

(73) Assignee: National Diversified Sales, Inc., Fresno, CA (US)

( * ) Notice: Subject to any disclaimer, the term of this patent is extended or adjusted under 35 U.S.C. 154(b) by 316 days.

(21) Appl. No.: 17/016,124

(22) Filed: Sep. 9, 2020

(65) Prior Publication Data

US 2022/0074532 A1    Mar. 10, 2022

(51) Int. Cl.
*F16L 41/02*    (2006.01)
*E04D 13/08*    (2006.01)

(52) U.S. Cl.
CPC ............ *F16L 41/021* (2013.01); *E04D 13/08* (2013.01); *F16L 41/02* (2013.01); *E04D 2013/0813* (2013.01)

(58) Field of Classification Search
CPC .... F16L 41/02; E03F 5/14; E03F 3/04; E04D 13/08
See application file for complete search history.

(56) References Cited

U.S. PATENT DOCUMENTS

| D401,013 S | 11/1998 | Ullmann |
| 7,651,297 B2 | 1/2010 | Villareal et al. |
| 7,871,109 B1 * | 1/2011 | McKinnon ............ F16L 37/098 |
| | | 285/903 |
| 9,714,736 B1 * | 7/2017 | Jetelina ..................... E03F 3/04 |
| 10,323,778 B2 | 6/2019 | Rusch |
| 10,926,199 B1 * | 2/2021 | Happel .................. E03F 5/101 |
| 2005/0040118 A1 * | 2/2005 | Bryant ............... B01D 21/2411 |
| | | 210/787 |
| 2017/0370506 A1 * | 12/2017 | Rusch ..................... F16L 23/00 |

* cited by examiner

*Primary Examiner* — Zachary T Dragicevich
*Assistant Examiner* — James A Linford
(74) *Attorney, Agent, or Firm* — Fulwider Patton LLP

(57) ABSTRACT

A catch basin comprising a circular collar with a first internal diameter, configured to receive a downwardly extending circular drain pipe. A sump for receiving downward water flow from the circular collar is integrally formed with the circular collar, the sump being shaped to include two differently shaped cylindrical portions. The shape of the sump facilitates both the ability to stack multiple units of the sump one upon another for packaging, shipping, and sale. The shape of the sump also facilitates the ability to remove an internal stub attached to the sump, to improve water flow in the remaining structure.

1 Claim, 8 Drawing Sheets

CIRCULAR CATCH BASIN

BACKGROUND

Catch basins are known in the art to provide a sump for catching downward flowing water from a roof gutter drain or the like, and then diverting the flow laterally as efficiently as possible in order to prevent the accumulation and ponding of water in the region of the downflow. In order to minimize the disruption presented by water flowing laterally adjacent a building in areas of high rainfall, such lateral flow is confined to flow in pipes connected to the catch basin, the pipes being positioned either underground or on the surface of the ground. The water flowing in the pipes eventually empties out at a location remote from the structure supporting the roof.

Construction problems arise during the installation of catch basins. Catch basins are typically made in unitary molded form from a suitable polymer. As may be noted in respect of catch basins known in the prior art shown in FIGS. 1-4, a typical catch basin 100 has a cylindrical inlet collar 112 which is circular in configuration and has an inner diameter D1 to match and receive the outer circular diameter of a standard downflow gutter. The inlet collar flows into a cylindrical sump 101 which terminates in a circular base 114. The sump 101 has a left outlet and a right outlet each comprising a choice of two "stubs" on each side, namely left inner and outer stubs—119, 118 respectively—and right inner and outer stubs stub 117, 116 (typically about 2 inch).

The term "stub" is used herein to described a short cylindrical tube (about 1.5 inches to 2 inches in length) of appropriate inner diameter, specially adapted for connection with an horizontal pipe (not shown) having an outer diameter sized to fit inside the stub.

Typically, the inner stub on each side is sized to receive a 2 inch outflow pipe, and the outer stub to receive a 3 inch outflow pipe. Each stub may be connected to a mating outflow pipe (not shown) so as to convey water out from the interior of the sump 101. These stubs present the installer with a choice, and s/he may choose between 2 inch and 3 inch stubs on the left and on the right. Different choices for lateral pipes give rise to certain problems, but to some extent, one of the problems arising has been broadly solved. In the prior art, frangible notched features have been provided (in the case of square catch basins) that separate the 2 inch tubes from the 3 inch stubs on each side, making it easy to knock out the smaller 2 inch attachment stub when the 3 inch attachment stub is selected for use. (See, for example, U.S. Pat. No. 10,323,778 which is concurrently owned by the present applicant.) By knocking out the smaller 2 inch attachment tube, a "full flow" advantage may be achieved, in which the smaller inner 2 inch stub is removed and is not present to obstruct the flow of water out of the catch basin via the 3 inch stub into the lateral pipes.

However, problems remain for frangible knock out features in the prior art field of circular catch basins such as the one seen in FIGS. 1-4. This prior art example does not show that a notched knock out feature is included and indeed it is not included. This is because the line forming the connection between the horizontal 2 inch circular stubs 117, 119 and the vertical circular sump 101 of the circular catch basin 100 follows a complex three dimensional shape in which a plane asymmetrically intersects with a circular cylinder. It is this complex shape that would have to receive the pre-formed notch, to facilitate knocking out the 2 inch stub. But, as one of ordinary skill will appreciate, a complex three dimensional shape will impose the result that the fracture takes place along vectors that are in line with the notch, rather than across the notch. This is an undesirable result, because it will typically result in unwanted elongate fractures outside of the notch instead of a clean controlled fracture inside the notch. This can be a highly disadvantageous result leading to a leaking connection between the catch basin 100 and the outflow pipe.

Therefore, there is a need in the prior art for an invention that will resolve the problem described above. The present invention addresses these and other needs. In yet another aspect of the prior art of circular catch basins, it is common for a single roofed structure to have multiple downward drain pipes and therefore utilizes multiple catch basins, each located at the bottom end of a downward roof drain pipe. Thus, building contractors will purchase perhaps dozens of catch basins for a single construction project. This introduces the additional problem of stacking and storing dozens of catch basins as the work proceeds. While the present invention addresses problems relating to the introduction of a suitable fracture plane for a frangible notch, it simultaneously addresses a problem relating to stacking and storing that is introduced by the introduction of a solution to the fracture plane. This will be further described in the detailed description of the invention.

SUMMARY OF THE INVENTION

In a preferred embodiment, the invention is a catch basin. The catch basin comprises a circular collar with a first internal diameter, configured to receive a downwardly extending circular drain pipe. A sump for receiving downward water flow from the circular collar is integrally formed with the circular collar, the sump being shaped to include two differently shaped cylindrical portions. The sump comprises a first cylindrical portion having a cross sectional external profile that is circular, and a second cylindrical portion having a cross sectional external profile that defines two opposite parallel straight lines of equal length. Under this arrangement, each straight line has a left terminal end and a right terminal end, and each left terminal end is connected to the other left terminal end by a first arc of a circle and each right terminal end is connected to the other right terminal end by a second arc of a circle, wherein, the first arc and the second arc share a common center point and radius of a common imaginary circle having a second external diameter that can be received inside the first internal diameter of the circular collar. Additionally, the second cylindrical portion defines a left planar surface and a right planar surface, and a left inner stub attached to the left planar surface, wherein a left frangible notch is formed in the left planar surface as a complete planar circle adjacent the left inner stub. Further, a right inner stub is attached to the right planar surface, wherein a right frangible notch is formed in the right planar surface as a complete planar circle adjacent the right inner stub. A left outer stub is positioned coaxially around the left inner stub, and attached to the sump; and a right outer stub, is positioned coaxially around the right inner stub, and attached to the sump.

These and other advantages of the invention will become apparent when read in conjunction with the drawings and the detailed description of further embodiments below.

DETAILED DESCRIPTION OF THE PREFERRED EMBODIMENTS

Figure 1:
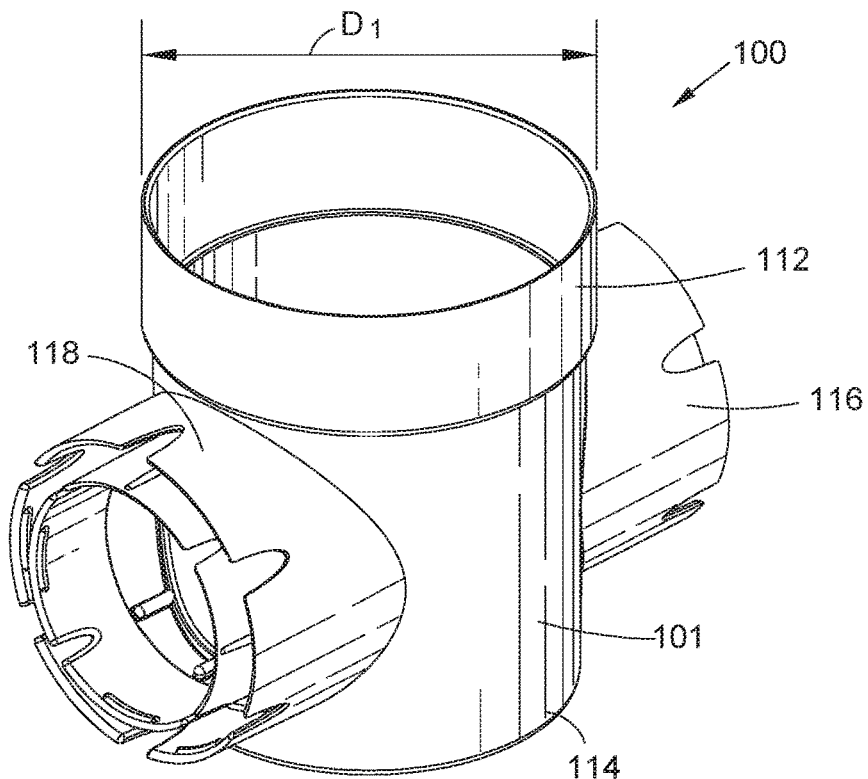
FIG. 1 is a perspective view from the front and above of a circular catch basin that is known in the prior art.
Figure 2:
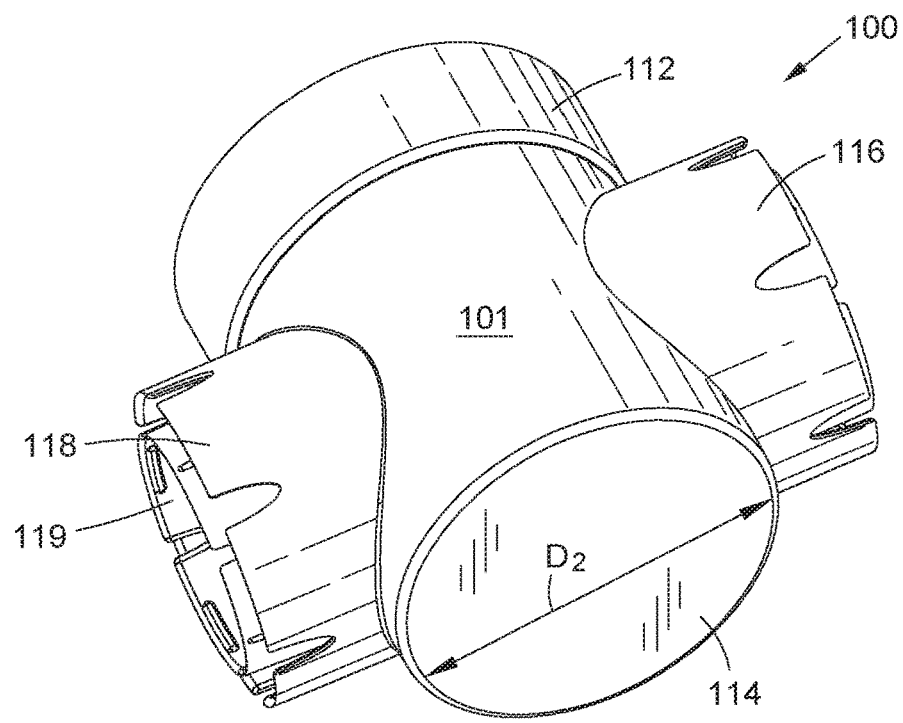
FIG. 2 is a perspective view from the front and below of the catch basin shown in FIG. 1.
Figure 3:
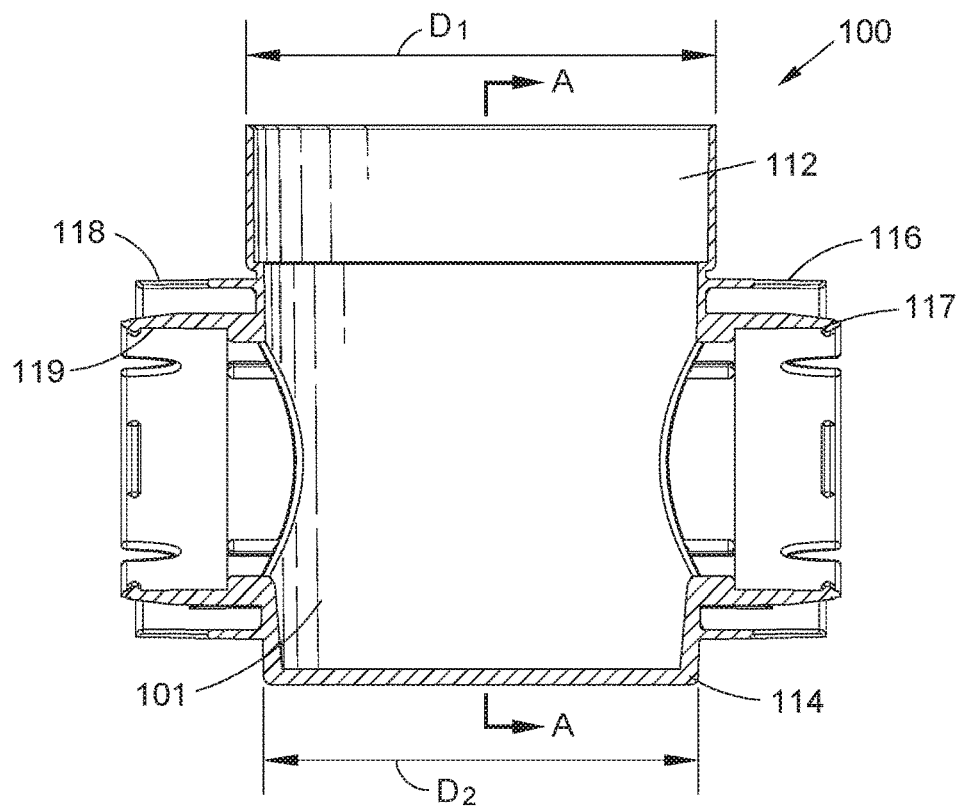
FIG. 3 is a vertical section view from the left side of the catch basin shown in FIG. 1.
Figure 4:
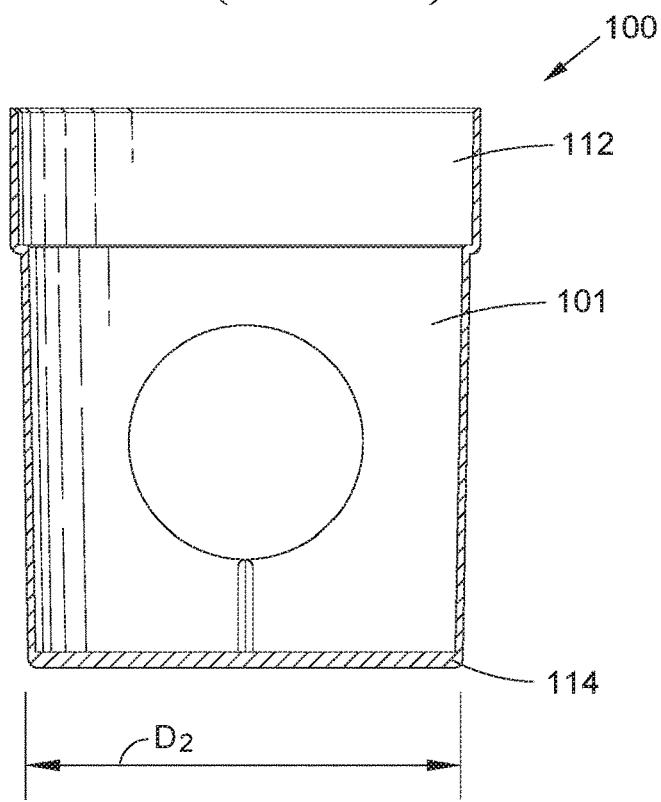
FIG. 4 is a vertical section view from the front of the catch basin shown in FIG. 1, taken substantially through the line A-A in FIG. 3.
Figure 5:
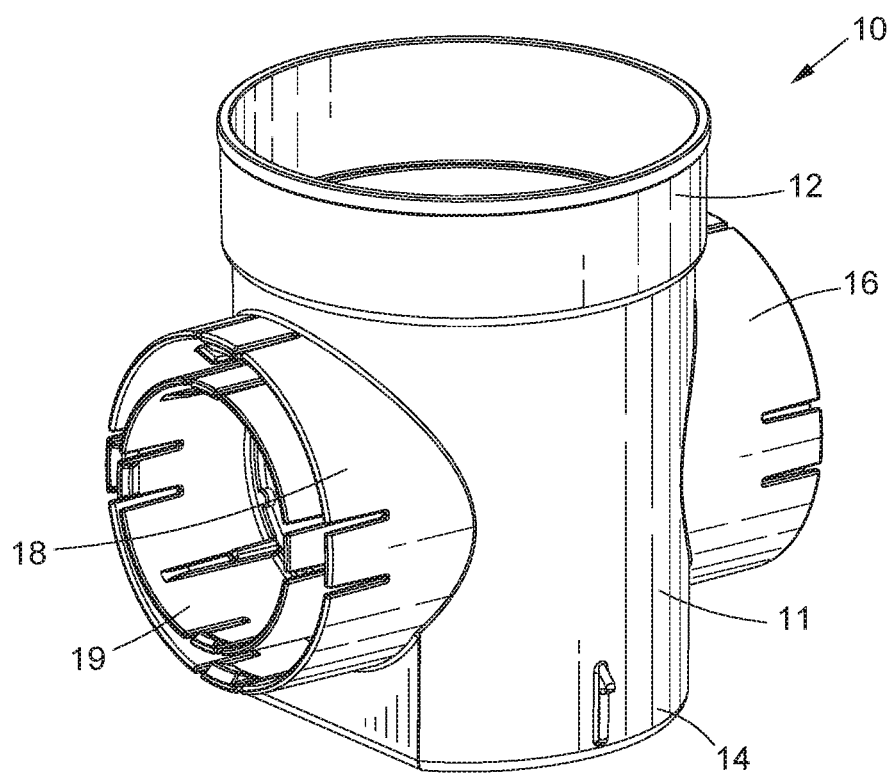
FIG. 5 is a perspective view from the front and above of a circular catch basin that shows features of the invention.
Figure 6:
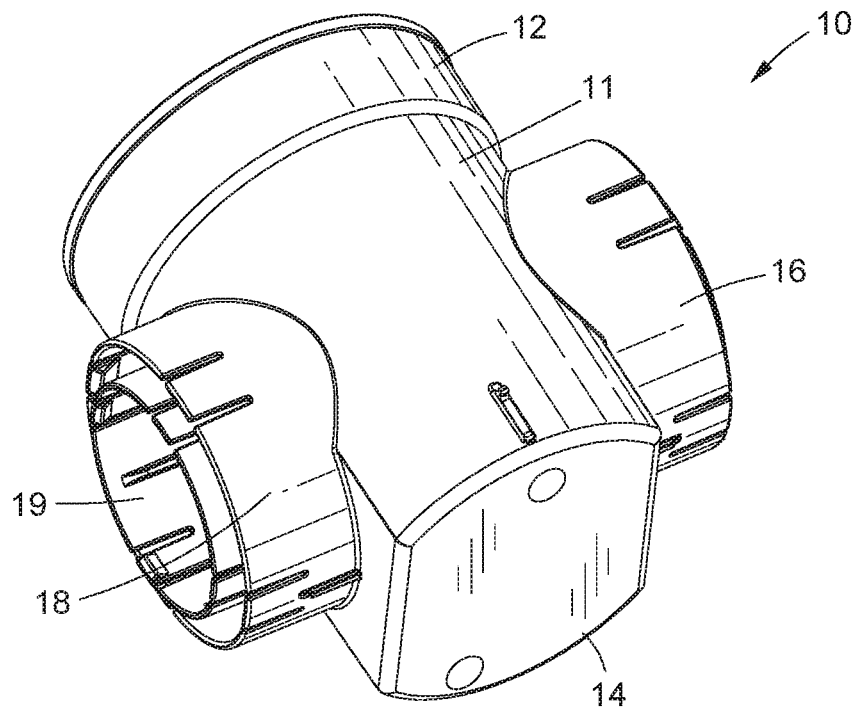
FIG. 6 is a perspective view from the front and below of the catch basin shown in FIG. 5.
Figure 7:
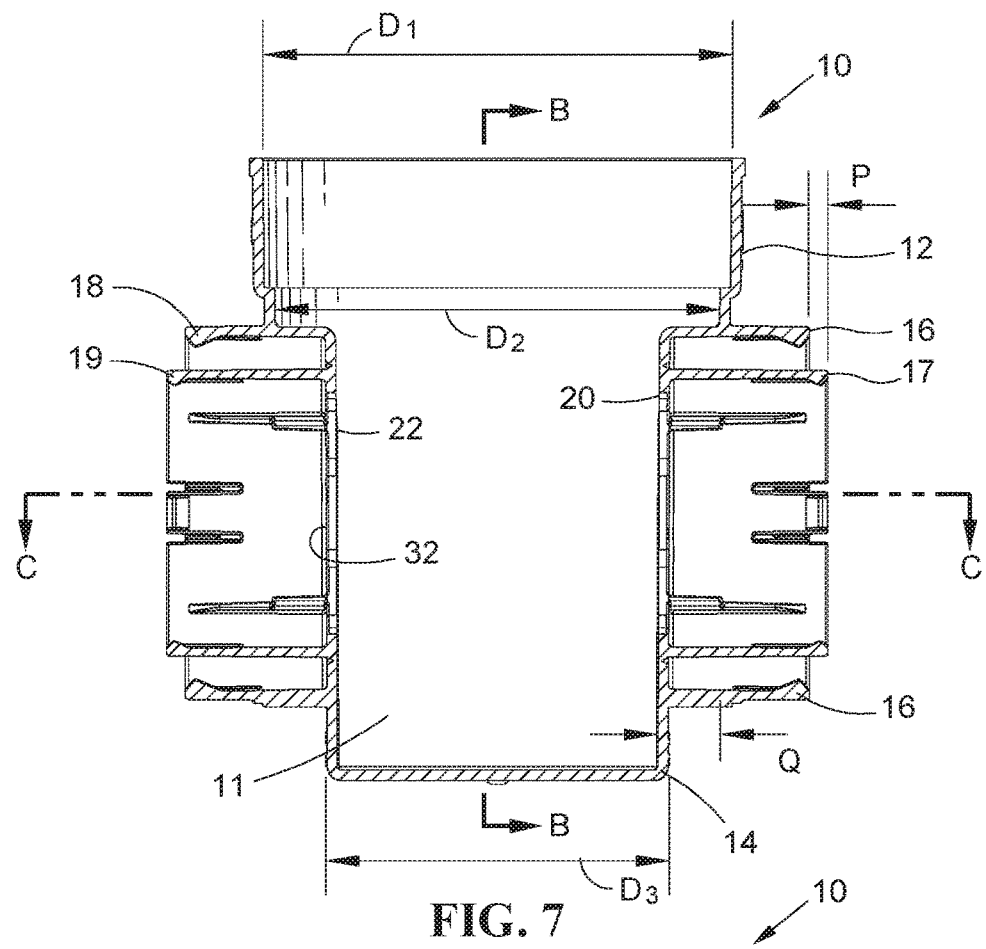
FIG. 7 is a vertical section view from the left side of the catch basin shown in FIG. 5.
Figure 8:
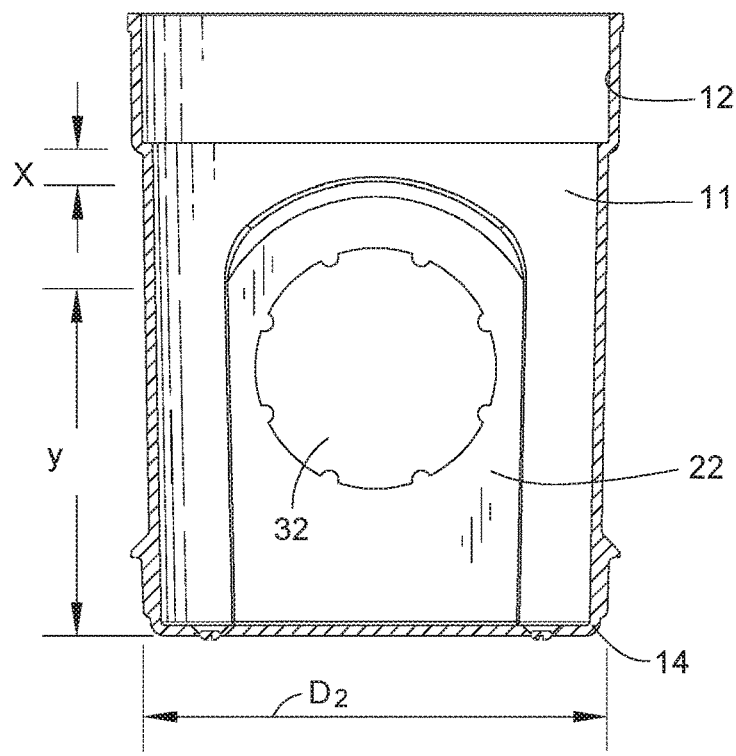
FIG. 8 is a vertical section view from the front of the catch basin shown in FIG. 5, taken substantially through the line B-B in FIG. 7.
Figure 9:
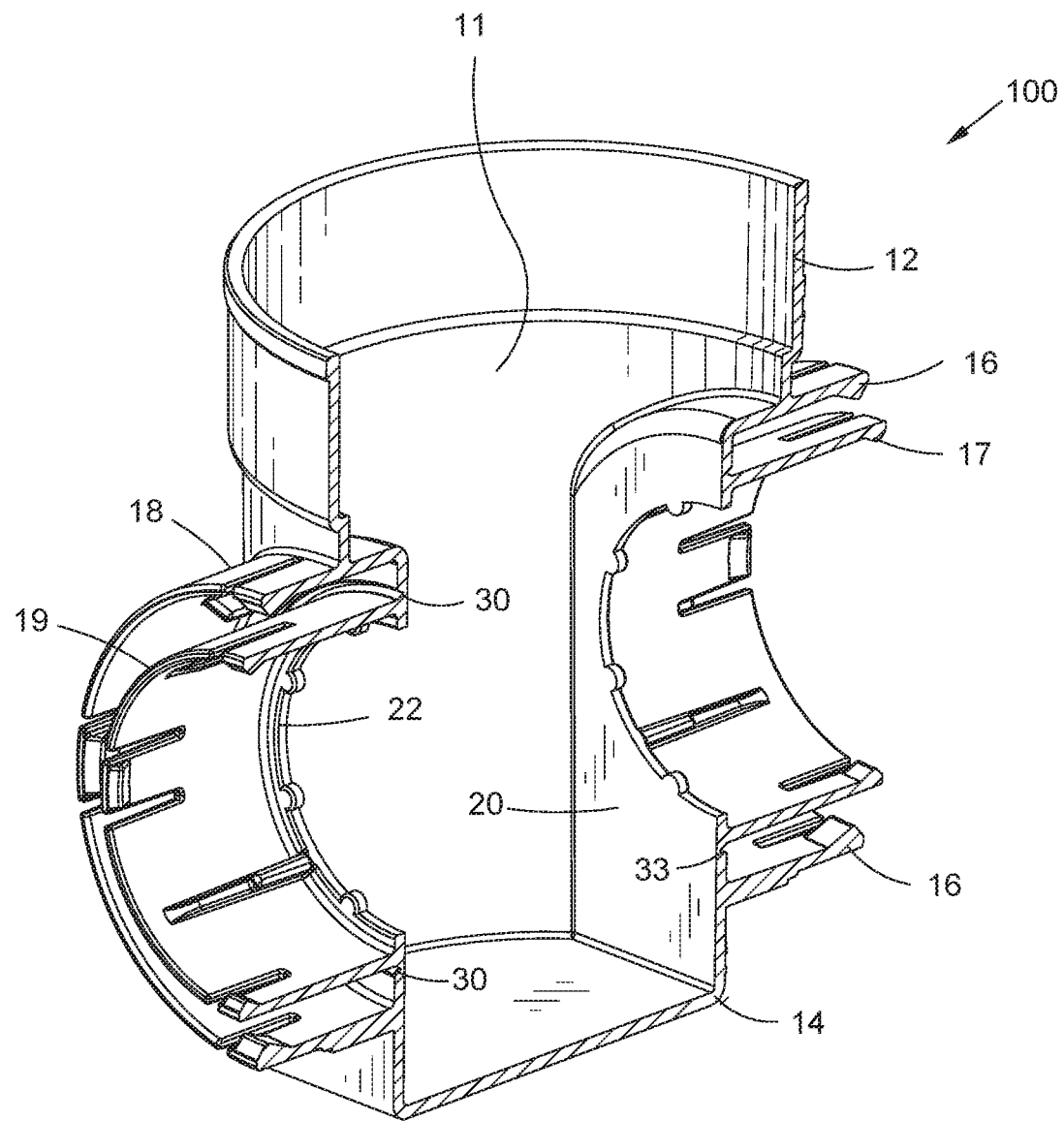
FIG. 9 is a vertical sectional perspective view of the catch basin shown in FIG. 5.

With reference to FIGS. 5-13, these figures show features of the invention here described. These figures show new and advantageous features for a circular catch basin 10 which address problems in the prior art.

The upper end of the catch basin 10 comprises a circular cylindrical reception collar 12. The depth of the collar may be about 1 inch, and it may have a constant interior diameter D1 and about one inch depth, the diameter being sized to receive a standard circular downflow drain pipe, not shown in the drawings.

The reception collar 12 flows into a sump 11. In the case of the invention 10, the sump differs from the sump 101 of the prior art shown in FIGS. 1-4. Significantly, the sump 11 includes a left planar wall 22 and a right planar wall 20 (best seen FIG. 7), although the remainder of the sump 11 which is not part of the planar walls 20, 22 retains its circular profile. The resulting shape, once the planar walls 20, 22 are imposed onto the otherwise circular sump 11, is a composite shape which is partially circular and partially planar. As will be explained herein, this novel composite shape provides a unique combination of advantages.

Shape of the Sump

But first, a detailed description of the geometry of the sump is set forth herein. The sump 11 is shaped to include two differently shaped cylindrical portions, one above the other, comprising a first cylindrical portion (marked "X" in FIG. 8) having a cross sectional external profile that is circular; and a second cylindrical portion (marked "Y" in FIG. 8) having a cross sectional external profile that is defined by two opposite parallel straight lines 40, 42 (best seen in FIG. 13) of equal length, wherein each straight line has a left terminal end 44, 46 and a right terminal end 48, 50, and each left terminal end is connected to the opposite left terminal end by a first arc 52 of a circle and each right terminal end is connected to the opposite right terminal end by a second arc 54 of a circle.

Figure 12:
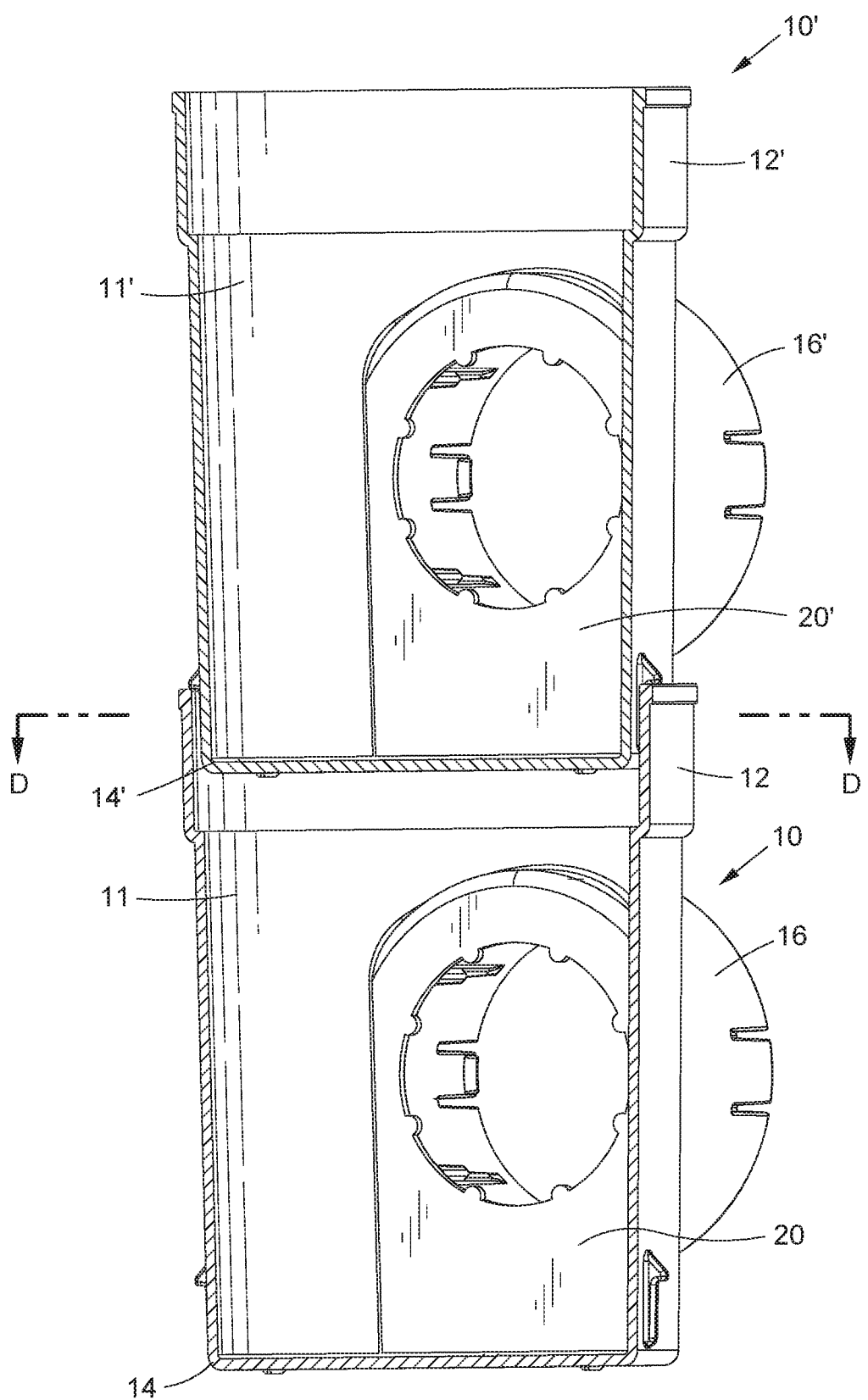
FIG. 12 is a vertical sectional view of two circular catch basins stacked on top of each other during storage and transportation.
Figure 13:
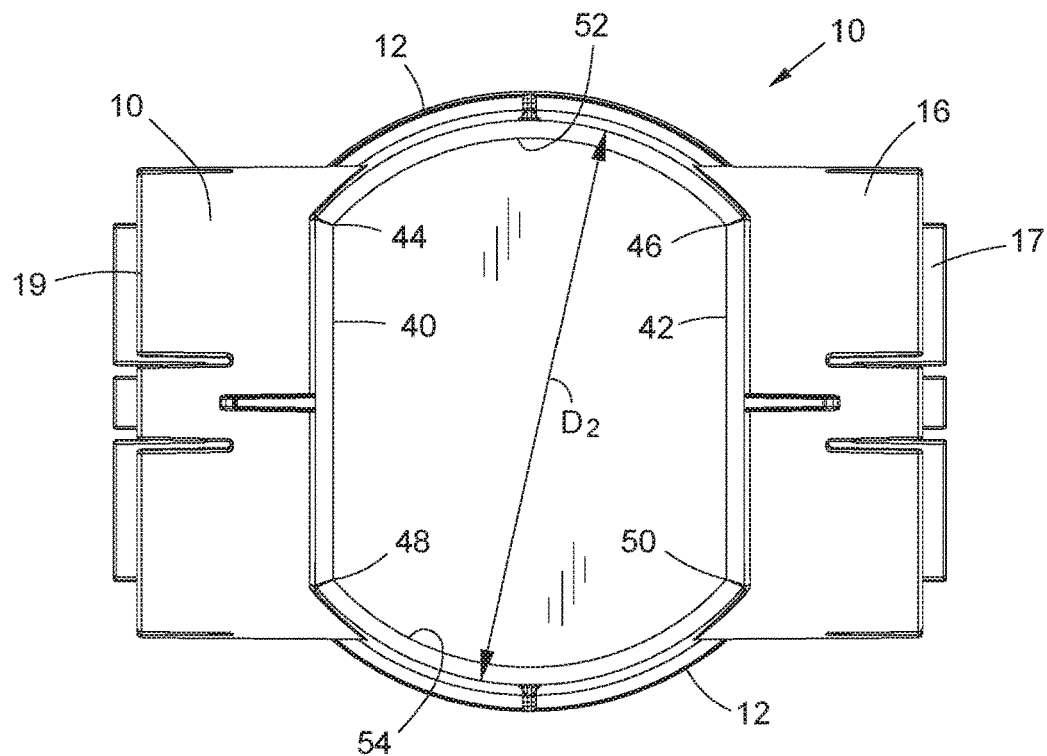
FIG. 13 is a bottom view of the catch basin shown in FIG. 5.

The first arc 52 and the second arc 54 share a common center point and diameter of a common imaginary circle having a second external diameter D2 that is sized to be comfortably received inside the first internal diameter D1 of the circular collar. As explained in greater detail below, this feature allows one catch basin 10', to be stored on top of another catch basin 10, as seen in FIG. 12, wherein the base 14' of an upper catch basin 10' is inserted into the collar 12 of a lower basin 10.

Under this configuration, the second cylindrical portion "Y" defines a left planar surface 20 and a right planar surface 22.

A left inner stub 19 is attached to the left planar surface 22. Based on this configuration, a left frangible notch 30 (See FIGS. 10, 11) is formed in the left planar surface 22 as a complete circle lying in a single plane, adjacent the left inner stub.

A right inner stub 17 is attached to the right planar surface 20. Based on this configuration, a right frangible notch 33 (see FIG. 9) is formed in the right planar surface 20 as a complete circle lying in a single plane, adjacent the right inner stub.

A left outer stub 18 is positioned coaxially around the exterior of the left inner stub 19, and is attached to the sump 11; and a right outer stub 16 is positioned coaxially around the exterior of the right inner stub 17, and attached to the sump 11.

As best understood with reference to FIGS. 9-13, the planar walls 20, 22 permit each of the cylindrical inner stubs 17, 19 to attach perpendicularly to each of the respective planar walls 20, 22 respectively. The outer stubs 16, 18 attach in part to the respective planar walls, although as understood with reference to FIGS. 5 and 6, such attachment is not achieved by the entire circular perimeter of the outer stubs 16, 18. Some portion of the outer stubs may flow around into a circular portion of the sump. See, FIG. 13.

Advantages of the Sump Geometry

Figure 10:
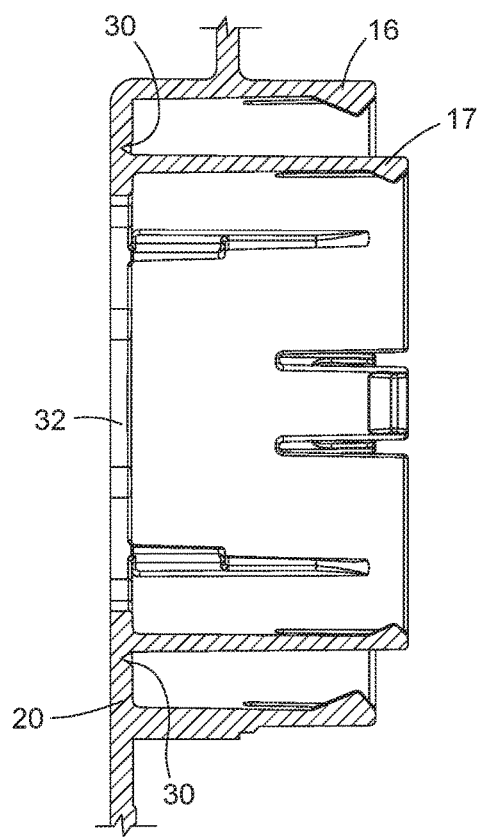
FIG. 10 is a detailed view of an aspect of FIG. 7.
Figure 11:
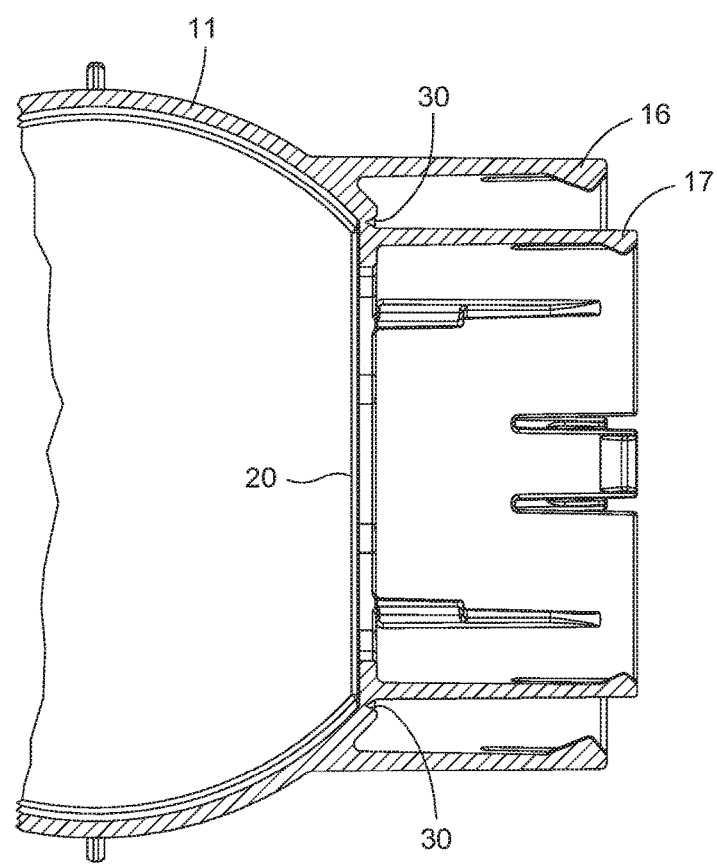
FIG. 11 is a horizontal partial sectional view of the catch basin shown in FIG. 7, taken substantially along the line C-C.

One of the advantages in the novel inventive shape of the catch basin 10 is that the connection of the inner stubs 17, 19 to the sump 11 is achieved via a completely circular notch 30 that surrounds the inner stubs at their line of connection; furthermore, this notch will lie completely in a single plane defined by the respective planar wall 20, 22. As best seen and understood, such exemplary notch 30 is shown in FIG. 10 and FIG. 11. The notch is configured to provide a frangible "knockout" feature that will allow an installer to remove an inner stub 17, 19 in instances where s/he decides to use the outer stub rather than the inner stub. Removal of the inner stub 17, 19 enlarges the aperture 32 through which fluid must flow to escape the sump, and provides a "free flow" configuration which allows a higher flow rate than if the 2 inch stub had been left in its fixed position.

Another advantage provided by the inventive shape of the catch basin 10 is that, in addition to providing the advantage described above, the shape of the base 14 of the sump 11 presents a shape that advantageously stacks one catch basin above another. FIG. 12 shows an upper catch basin 10' which is described using all reference numerals including a "prime" to indicate that it is part of an upper catch basin in relation to the disclosed lower catch basin 10, for which reference numerals do not include a "prime." FIG. 12 shows, in vertical sectional view, how these two catch basins may be stacked, one on top of the other. The lower portion 14' of the upper catch basin 10' is inserted into the upper collar 12 of the lower catch basin 10.

Figure 14:
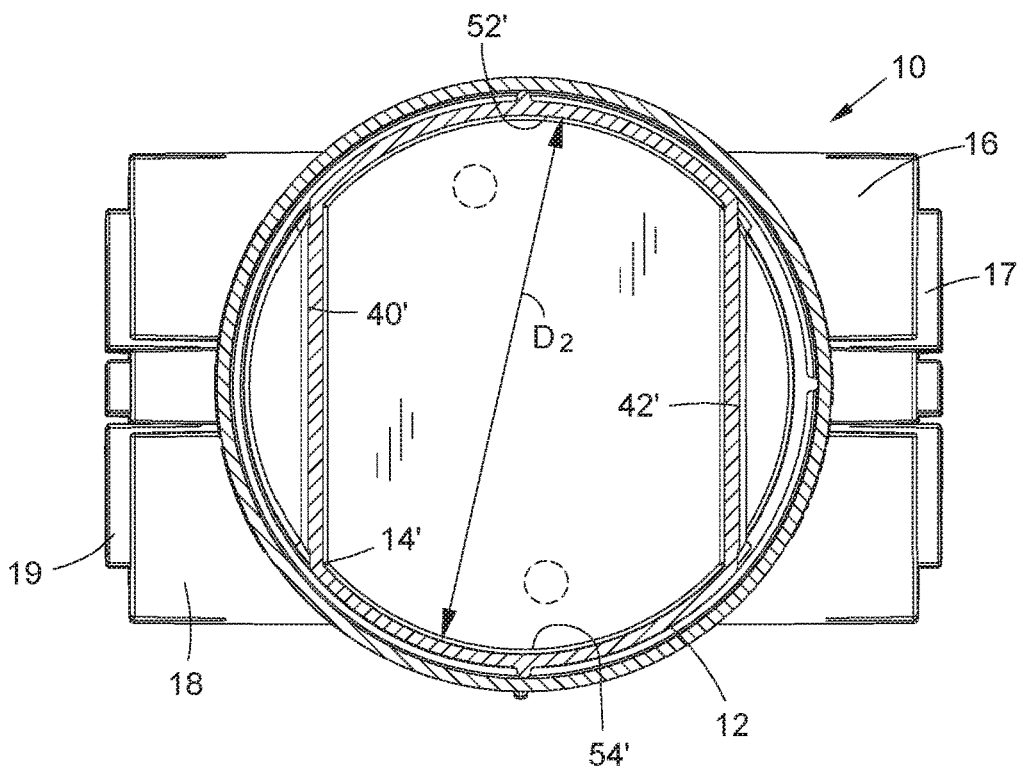
FIG. 14 is a sectional view of an upper catch basin stacked with a lower catch basin, taken substantially along the line D-D in FIG. 12.

FIG. 12 and FIG. 14 show how the shape of the base 14' defines a portion of a circular shape consisting of the two arcs 52' and 54' having a diameter D2 which is sized to fit snugly into the inner diameter of the collar 12 of the lower catch basin 10. This feature allows one catch basin 10', to be securely stored on top of another catch basin 10, as seen in FIG. 12, wherein the base 14' of an upper catch basin 10' is inserted into the collar 12 of a lower basin 10. The advantage arises because the base 14' has both parallel planar surfaces extending from it, and also has two arcs 52' and 54' which provide an extended surface for snug contact to the inner diameter of the circular collar 12 of the lower catch basin. This novel shape satisfies two functional requirements simultaneously, namely, a) providing parallel planar surfaces for a frangible notch to occupy, and b) providing opposing curved surfaces that lock into a circular collar, thereby reducing rattle and sliding during motion when a plurality of sump units are stacked for shipping, one upon another.

Accordingly, there is described a novel system and method that addresses needs in the art. The shape of the sump facilitates both the ability to stack multiple units of the sump one upon another for packaging, shipping, and sale. The shape of the sump also facilitates the ability to remove an internal stub attached to the sump, to improve water flow in the remaining structure.

The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A catch basin comprising:
a circular collar with a first internal diameter, configured to receive a downwardly extending circular drain pipe;
a sump for receiving downward water flow from the circular collar is integrally formed with the circular collar, the sump being shaped to include two differently shaped cylindrical portions, comprising:
  a first cylindrical portion having a cross sectional external profile that is circular; and
  a second cylindrical portion having a cross sectional external profile that defines two opposite parallel straight lines of equal length,
  wherein each straight line has a left terminal end and a right terminal end, and each left terminal end is connected to the other left terminal end by a first arc of a circle and each right terminal end is connected to the other right terminal end by a second arc of a circle,
  wherein, the first arc and the second arc share a common center point and radius of a common imaginary circle having a second external diameter that can be received inside the first internal diameter of the circular collar;
  further wherein, the second cylindrical portion defines a left planar surface and a right planar surface, and
a left inner stub attached to the left planar surface, wherein a left frangible notch is formed in the left planar surface as a complete planar circle adjacent the left inner stub;
a right inner stub attached to the right planar surface, wherein a right frangible notch is formed in the right planar surface as a complete planar circle adjacent the right inner stub;
a left outer stub, positioned coaxially around the left inner stub, and attached to the sump; and
a right outer stub, positioned coaxially around the right inner stub, and attached to the sump.

* * * * *